(12) United States Patent
Kunreddy et al.

(10) Patent No.: US 12,517,840 B2
(45) Date of Patent: Jan. 6, 2026

(54) CACHE ACCESS REJECTION FOR UNAUTHORIZED SECURE CACHE ID FROM KNOWN MASTER

(71) Applicant: QUALCOMM Incorporated, San Diego, CA (US)

(72) Inventors: Chandrashekar Reddy Kunreddy, Hyderabad (IN); Hithesh Hassan Lepaksha, Hyderabad (IN); Sharath Kumar Nagilla, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 173 days.

(21) Appl. No.: 18/359,407

(22) Filed: Jul. 26, 2023

(65) Prior Publication Data

US 2025/0036574 A1    Jan. 30, 2025

(51) Int. Cl.
  *G06F 12/14*  (2006.01)
  *G06F 12/1009*  (2016.01)
  *G06F 21/44*  (2013.01)
  *G06F 21/62*  (2013.01)

(52) U.S. Cl.
  CPC .......... *G06F 12/14* (2013.01); *G06F 12/1009* (2013.01); *G06F 21/44* (2013.01); *G06F 21/6218* (2013.01)

(58) Field of Classification Search
  CPC .. G06F 12/1441; G06F 12/0811; G06F 12/14; G06F 12/1009; G06F 21/44; G06F 21/6218
  See application file for complete search history.

(56) References Cited

U.S. PATENT DOCUMENTS

| | | | |
|---|---|---|---|
| 7,487,327 B1 * | 2/2009 | Chang | G06F 12/1081 710/3 |
| 2009/0132780 A1 * | 5/2009 | Maier | G06F 12/126 711/170 |
| 2012/0246408 A1 * | 9/2012 | Yamamura | G06F 12/0842 711/125 |
| 2021/0406056 A1 * | 12/2021 | Shanbhogue | G06F 9/5016 |

* cited by examiner

*Primary Examiner* — Matthew T Henning
(74) *Attorney, Agent, or Firm* — Loza & Loza, LLP (57) ABSTRACT

An interconnect controller is coupled to a cache and coupled to a plurality of masters and configured to receive a cache access packet from a master. The cache access packet includes a first master identifier to identify the master, a first sub-cache index identifier to identify a slice of the cache, and an operation to be performed on the cache. A mapping table has master identifiers associated with sub-cache index identifiers and compare logic compares the first master identifier and the first sub-cache index identifier to the mapping table. The interconnect controller rejects the cache access packet in response to the first master identifier not being associated with the first sub-cache index identifier in the mapping table.

22 Claims, 6 Drawing Sheets

| SCID | Target Add. | Op. Code | Status | Length | BID | PID | MID | Payload | |
|---|---|---|---|---|---|---|---|---|---|
| 0x0 | 0xc10000000 | Read/Write | REQ | 0x1f | 0 | 11 | 01 | Data | 206 / 208 |

204

| Master | SCID | MID | |
|---|---|---|---|
| M1 | 1 | 21 | 212 / 214 |
| M2 | 4 | 22 | |
| M2 | 7 | 22 | |
| M3 | 3 | 23 | |
| M4 | 8 | 24 | |

CACHE ACCESS REJECTION FOR UNAUTHORIZED SECURE CACHE ID FROM KNOWN MASTER

TECHNICAL FIELD

Aspects of the present disclosure relate generally to cache access using secure cache IDs from known masters and, in particular, to rejecting a cache access for an unauthorized secure cache ID.

BACKGROUND

Modern computing systems use different types of memory that are arranged in a hierarchy. The fastest and closest memory is referred to as cache and may be formed on the same die or included in the same package with a processing system. External random-access memory is slower and the main storage that includes applications and the operating system is slower still and much larger. The cache may also be in a hierarchy in which Level 1 cache is the smallest and closest to a processing core, Level 2 cache is a little larger and slower to access and Level 3 cache is much larger and slower to access than Level 1 or Level 2. Different systems have different numbers of levels of cache. The Level 2 or Level 3 cache is sometimes referred to as Last Level Cache (LLC) corresponding generally to the largest cache within the processing system.

Cache may be allocated to different masters of a processing system using a Sub-Cache Index ID (SCID). The SCID acts as an address to a particular slice or block of a cache and each master is allocated one or more slices of the cache, e.g., the (LLC). There is an initial allocation at startup that is determined by the operating system (OS) or a user or administrator configuration. In some systems, the OS is able to reallocate the SCID to reconfigure the system after startup.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example, a cache access packet is rejected using a mapping table. An apparatus includes a cache having a plurality of slices, the cache being accessible to a plurality of masters. An interconnect controller is coupled to the cache and coupled to the plurality of masters and configured to receive a cache access packet from a master, the cache access packet including a first master identifier configured to identify the master, a first sub-cache index identifier configured to identify a slice of the cache, and an operation to be performed on the cache. A mapping table comprises master identifiers associated with sub-cache index identifiers and compare logic is configured to compare the first master identifier and the first sub-cache index identifier to the mapping table. The interconnect controller is configured to reject the cache access packet in response to the first master identifier not being associated with the first sub-cache index identifier in the mapping table.

In another example, a method includes receiving a cache access packet from a master, the cache access packet including a first master identifier configured to identify the master, a first sub-cache index identifier configured to identify a slice of a cache, and an operation to be performed on the cache, wherein the cache is accessible to a plurality of masters; comparing the first master identifier and the first sub-cache index identifier to a mapping table comprising master identifiers associated with sub-cache index identifiers; and rejecting the cache access packet in response to the first master identifier not being associated with the first sub-cache index identifier in the mapping table.

In another example a non-transitory computer-readable medium has instructions stored therein for causing a processor of an interconnect link to perform the operations of the method above.

In another example an apparatus includes a means for receiving a cache access packet from a master, the cache access packet including a first master identifier configured to identify the master, a first sub-cache index identifier configured to identify a slice of a cache, and an operation to be performed on the cache, wherein the cache is accessible to a plurality of masters; a means for comparing the first master identifier and the first sub-cache index identifier to a mapping table comprising master identifiers associated with sub-cache index identifiers; and a means for rejecting the cache access packet in response to the first master identifier not being associated with the first sub-cache index identifier in the mapping table.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

As described herein a cache controller, e.g., a last level cache (LLC) controller, detects incoming traffic from two or more different masters that use the same SCID to access the cache. Each read or write operation from a master is in the form of a cache access packet that has at least a master identifier (MID) and the SCID. Typically, a cache access packet also includes a physical identifier (PID) and some other information. The identifiers in the cache access packet headers, e.g., MID, PID, SCID, are compared to a mapping table maintained by the cache controller to verify the cache access packet before it is pushed to the LLC. The table comparison screens out any cache access packet from a master that claims an SCID that is already associated with a different master. In addition to rejecting the unauthorized cache access, an error warning and a security warning can be generated.

In some circumstances, a master may use a wrong SCID that has already been allocated to a different master. When two different masters generate read or write operations toward a cache controller, e.g., an LLC controller, using the same SCID, there can be performance degradation, operation failures, or even a security risk. This may occur through an error in the original allocation, through a corruption of an SCID value stored in a memory, or even through an external attack on the system. In some circumstances, the wrong SCID may have been selected by the operating system, an application, or an external connection.

The mapping table to verify cache access may be initially generated at startup when a static table that maps each MID to one or more SCIDs is loaded into the cache controller. During operation, the SCID allocations may be modified as a dynamic reallocation of the LLC using the SCIDs. A master is able to relinquish LLC slices that it does not need and another master is able to request whether there are any available slices that it may be granted. A disassociation message is sent from the master that was previously associated with a particular SCID and a new SCID association message is sent to the new master. The new MID/SCID association is also sent to the cache controller in order to update the mapping table. This mechanism also allows masters to claim and to disown LLC slices on demand with a priority-based slice allocation.

Figure 1:
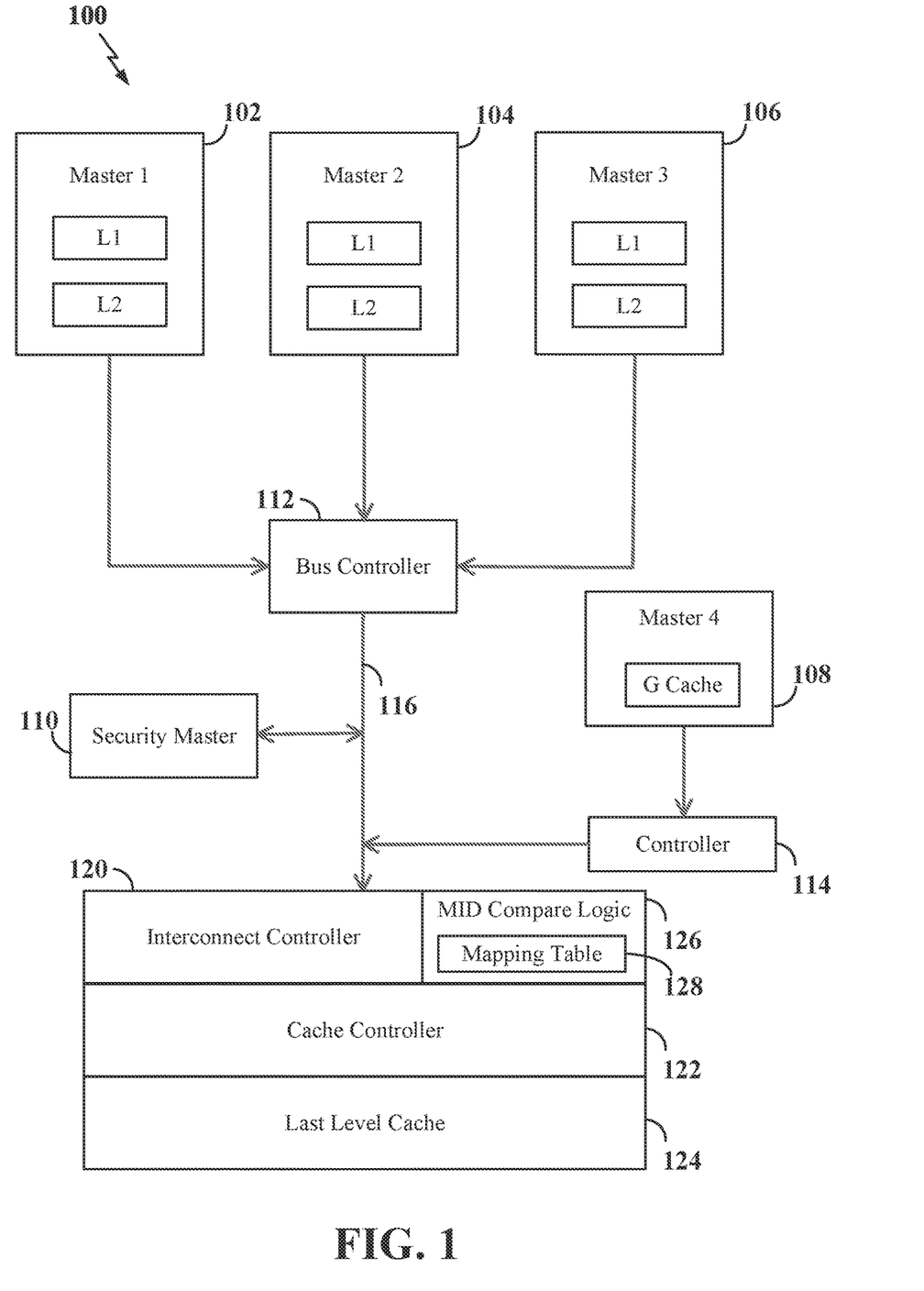
FIG. 1 illustrates a diagram of cache access and cache access rejection using a mapping table, in accordance with aspects of the disclosure.

FIG. 1 is a diagram of cache access and allocation for a processing system 100 with multiple masters. A first master 102 includes a Level 1 (L1) cache and a Level 2 (L2) cache. A second master 104 also includes an L1 cache and an L2 cache. A third master 106 includes an L1 cache and an L2 cache. A fourth master 108, e.g., a graphics master, includes a graphics cache. Each master may include multiple cores and may be formed on multiple dies or on multiple chips. Each master may be optimized for particular types of tasks, such as central processing, graphics, digital signal processing, neural processing, and artificial intelligence. Each master has access to a last level cache (LLC) 124 through a bus 116 and a cache controller 122. The last level cache may also be referred to as a Level 3 (L3) cache and the cache controller as an LLC controller. For the fourth master 108, the LLC is a second level cache, in effect. Different masters may have more or fewer internal levels of cache so that the LLC may serve as an L1 cache for some masters and a higher level, e.g., L3, L4, etc. cache for other masters.

The first master 102, the second master 104, and the third master 106 are coupled through a bus to a bus controller 112. The bus controller 112 is coupled through a bus 116 to an interconnect controller 120. The fourth master 108 is also coupled through a controller 114 to the bus 116 and the interconnect controller 120. The interconnect controller 120 is coupled to the cache controller 122 that provides access to the LLC 124. This bus configuration allows each master to access the same LLC 124 through the cache controller 122. The cache controller 122 services read and write packets, e.g., cache access packets, from the masters and also maintains and manages the LLC 124. A security master 110 is also coupled to the bus 116 and is accessible to each of the masters and the interconnect controller 120 through the bus. The security master may be a part of another master or of a supervisor or management core for the system. It may be external to the other components shown.

There may be more or fewer masters and more or fewer controllers, including a cache coherency controller (not shown). The bus configuration may be modified to suit different applications. A system may have some masters that use a different LLC or do not use the shared LLC. Masters may be combined or separated to suit different implementations. The particular configuration of masters, controllers, and bus is provided as an example to illustrate the principles described herein. There may be additional registers, tables and logic used to access and use the cache, including logical to physical address maps, not shown here in order to simplify the drawing.

While the shared cache is referred to as an LLC, the same principles, techniques, and structures may be applied to other types of memory, including volatile and non-volatile memory. These types of memory are referred to herein generally as cache. For example, the LLC 124 may include any type of memory, such as, for example, static random-access memory (SRAM) and/or dynamic random-access memory (DRAM). The DRAM may be, for example, double data-rate synchronous DRAM or DDR-SDRAM, sometimes referred to as DDR, or flash or magnetic or any other suitable type of memory. The LLC 124 may serve as an intermediary storage shared by at least two masters or a system-level cache or any other type of storage shared by multiple masters.

A cache access packet on the bus from a master to access the LLC includes a header. The header includes at least a master identifier (MID), a sub-level cache index identifier (SCID) and an operation code, e.g., read or write. The interconnect controller 120 is coupled to MID compare logic 126 that includes a mapping table 128. The interconnect controller 120 parses the cache access packet header and extracts the MID and the SCID and passes this to the MID compare logic 126. The MID compare logic 126 compares the MID and SCID to values in the mapping table 128 to determine whether there is a match between the cache access packet and the mapping table 128.

When there is a match, then the cache access packet is verified and the interconnect controller 120 passes the cache access packet to the cache controller 122 to service the cache access packet using the LLC 124. When there is no match between the cache access packet and the mapping table 128, then the interconnect controller rejects the cache access packet. In addition, interrupts may be sent to the security master 110 and the originating master by the interconnect controller. The interrupts may include an error warning and a security warning.

Figure 2:
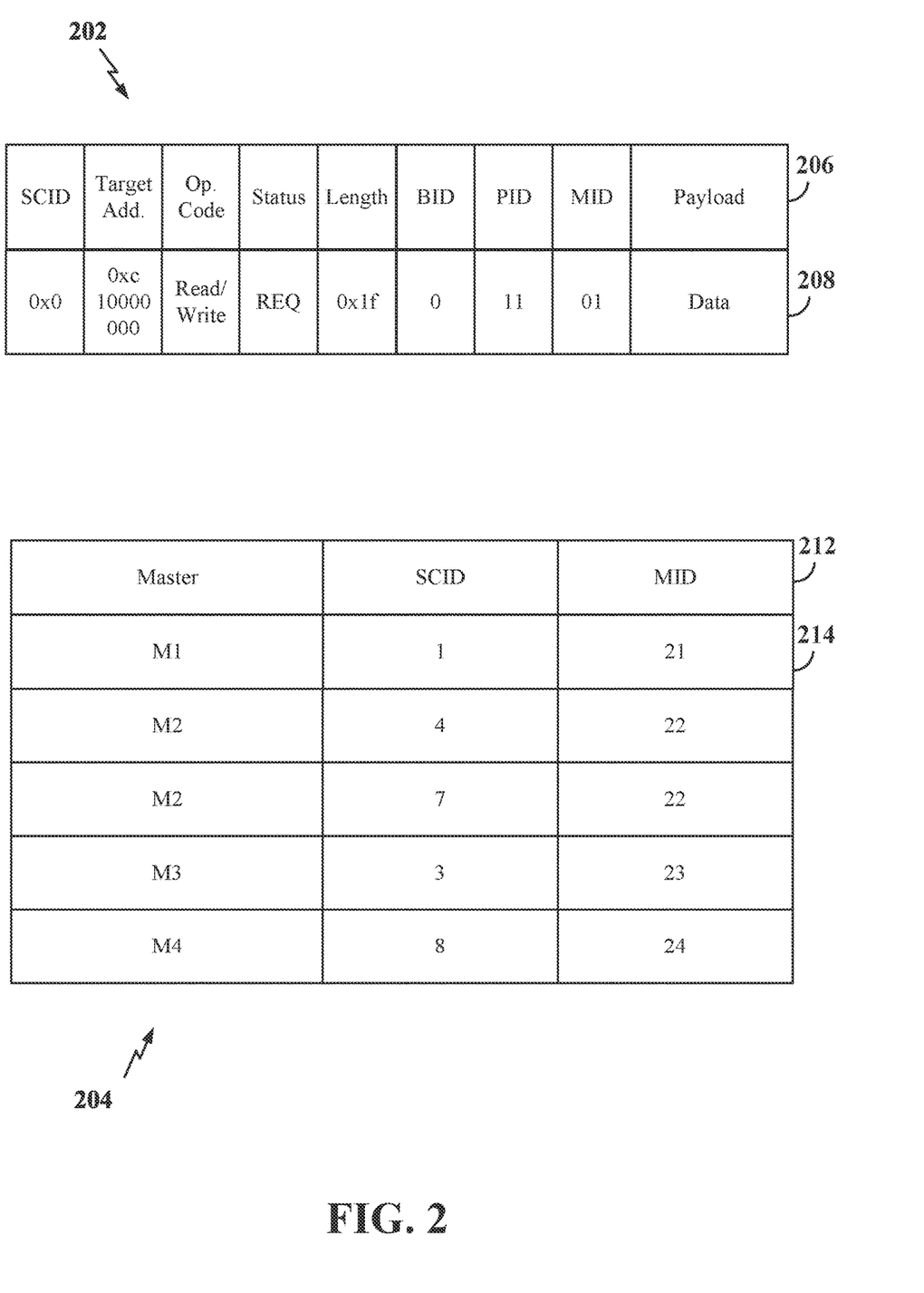
FIG. 2 illustrates a cache access packet structure and a mapping table, in accordance with aspects of the disclosure.

In some implementations, a cache access packet has a structure as shown in Table 202 of FIG. 2. The table has a header row 206 for illustration purposes. A cache access packet does not require a header row. The values of the data row 208 are shown as examples of the structure and not actual values. The payload is the data to be written into the cache at the target address within the SCID and has a length as provided in the length field. The cache access packet of this example has the status of being a request.

The mapping table 128 of the MID compare logic 126 may be used to track the allocation for each master that has access to the LLC and also to verify that a cache access packet is proper. Table 204 is a representation of an example of a mapping table suitable for use with the system of FIG. 1. The mapping table 128 may have more columns to track additional values and may be used for additional purposes. While the structure is shown and described as a two-dimensional table with a header row 212 and data rows 214 for each slice, any other data structure may be used including lists, look-up tables, and content-addressable memories.

Table 204 shows that the masters have an MID of 21, 22, 23, or 24, respectively, and that each MID is associated with an SCID. Master M2 (22) is allocated two SCIDs and may send cache access requests to addresses in the slice associated with SCID 4 or the slice associated with SCID 7. The SCID allocation to the masters need not be sequential.

The mapping table 128 may be generated at startup by loading the mapping table from a configuration register. The configuration register may represent a last stable state or an initial configuration from an operating system, a user, or an administrator. The configuration register may be in the interconnect controller, in a system memory, or another suitable location. The mapping table may also be modified when a memory controller, e.g., the interconnect controller 120, allocates or deallocates an SCID to or from a master. A master may send a change packet to the interconnect controller 120 to surrender a slice of cache, or a master may send a change packet to the interconnect controller 120 to request an additional slice of cache to service an additional functionality. In some instances, applications running on a master may cause such change packets to request additional cache on application launch or at other times. The interconnect controller 120 may then inform the MID compare logic 126 to update the mapping table 128 after making the change. This may be in the form of a table update message from the interconnect controller 120.

Figure 3:
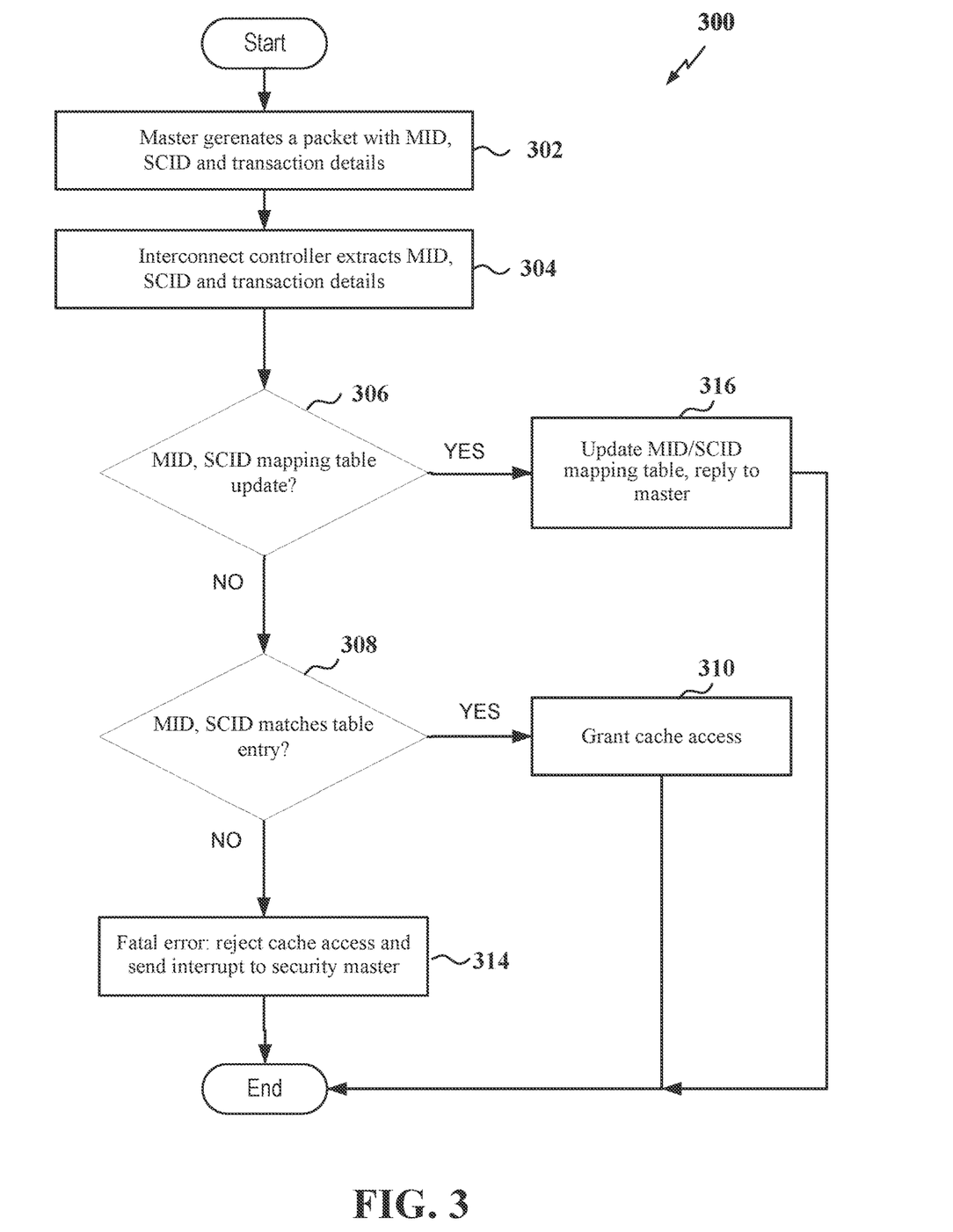
FIG. 3 illustrates a flow diagram of granting and rejecting cache access using a mapping table, in accordance with aspects of the disclosure.

FIG. 3 is a process flow diagram of rejecting cache access at an interconnect controller. Before the process 300 begins, there is an initial configuration of the allocations of slices to the various masters that share the respective cache. The initial configuration is then stored in the mapping table for use when cache access packets are received. The process begins when a master generates a cache access packet with an MID, SCID, and other transaction details at block 302. The particular additional transaction details may vary with different implementations. Table 202 provides a suitable example for some configurations. The cache access packet may be a read or a write operation or another operation, depending on the configuration of the system.

At 304, the interconnect controller, upon receiving the cache access packet parses the header. The MID and SCID are extracted in order to verify the cache access packet. At 306, the interface controller determines whether this packet is a table update message to update the mapping table or another type of packet. In some examples a table update message has the same structure as a cache access packet with a different operation code. In some examples, the operation code is for a table update instead of for a read or write. If it is not a table update message, then at 308, the MID, SCID combination in the header of the cache access packet is verified by comparison against the mapping table.

If the MID, SCID combination matches a mapping table entry then the interconnect controller grants access to the cache at 310 by forwarding the cache access packet to the cache controller. The cache controller manages the cache access operation of the cache access packet to service the cache access packet. If instead, the MID, SCID combination does not match any mapping table entry, then, at 314, a fatal error is generated. The interconnect controller rejects access for the cache access packet and an interrupt, e.g., an IRQ, is sent to the security master.

There are different possible reasons to cause the MID, SCID combination to not match any mapping table entry. The SCID or MID may become corrupted with time. A bit may become flipped and other data errors may occur. In this case, the master is attempting to access the wrong slice of the cache. The master will overwrite data that may be needed by a different master or the master may read the wrong data, corrupting the process for which it requested the write operation. There may be an error in a software application in which the software is using an outdated or erroneous SCID. There may also be a conflict in which two instances of an application have been launched on two different masters and are operating with the same SCID. In this case, one instance of the application should be terminated so that the operation and intermediate results do not conflict.

Another possible cause is an external threat. Malware may be installed that seeks to corrupt a slice of a cache through inappropriate cache access, cause a denial-of-service attack, or access a slice of cache to obtain the stored data for unauthorized purposes. The security master, upon receiving the interrupt may determine the cause and act accordingly. The security master may have resources and capabilities that are not available to the interconnect controller. The interrupt may be, for example, an error warning or a security warning. In some examples, the interrupt includes the MID and SCID of the cache access packet that did not match. In some examples, the entire cache access packet is sent to the security master. The security master may be able to take immediate action to protect the integrity of the cache and the overall system.

When the packet is a table update message at 306, then at 316, the mapping table is updated to include the new MID, SCID combination and any other suitable information from the table update message. The table update message is a change packet received from an application or other external component indicating a request for a grant of a slice of cache to a master. The interconnect controller checks the mapping table to ensure that the requested MID, SCID combination is not already in the mapping table. If the requested slice is available then the mapping table may be updated at 316 to add the requested MID, SCID combination in response to the change packet. The interconnect controller may also send a reply to the originating master indicating that the slice has been granted. The master may then use the SCID for this slice for future cache access packets.

Figure 4:
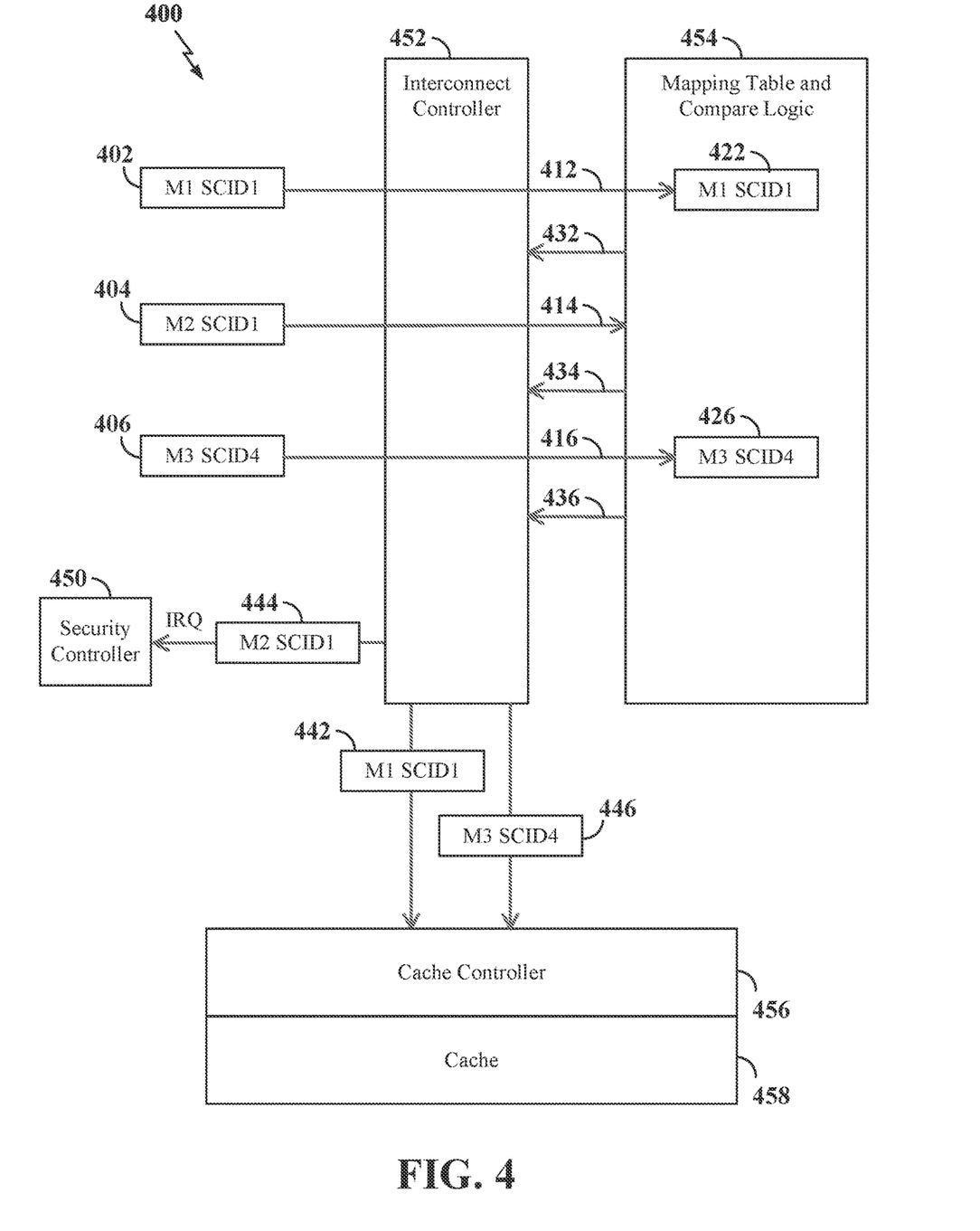
FIG. 4 illustrates a functional diagram of packet header comparison with a mapping table to grant or reject cache access, in accordance with aspects of the disclosure.

FIG. 4 is a diagram of cache access rejection using a mapping table and compare logic. An interconnect controller 452 is coupled to a mapping table and compare logic 454. The interconnect controller 452 forwards cache access packets to a cache controller 456 or forwards cache access packets to a security controller 450.

Considering particular packets, a first cache access packet 402 from master M1 with SCID 1 arrives at the interconnect controller 452. The interconnect controller parses the cache access packet, extracts any relevant header data and forwards 412 the relevant data to the mapping table and compare logic 454. The mapping table and compare logic 454 may be incorporated into the interconnect controller 452 or be separate components as shown. The mapping table may be stored with the compare logic or in any suitable accessible memory location. The mapping table and compare logic finds an entry 422 for M1, SCID1 and returns a positive verification 432 to the interconnect controller 452. In response to receiving the positive verification 432, the interconnect controller 452 forwards the cache access packet 442 to the cache controller 456 which then services the cache access packet.

A second cache access packet 404 from master M2 also seeks to access SCID 1. The interconnect controller parses the cache access packet and forwards 414 header data to the mapping table and compare logic 454. However, there is no entry for this header data in the mapping table. The mapping table and compare logic returns a negative verification 434 to the interconnect controller 452. In response to the negative verification 434, the interconnect controller 452 sends an interrupt, e.g., an IRQ to the security controller 450. In some examples, the IRQ includes the entire cache access packet 444. In some examples, the IRQ includes only the relevant header data. In addition, the second cache access packet 404 is rejected and not forwarded to the cache controller.

A third cache access packet 406 from master M3 contains an MID for M3 and SCID 4 in the header of the cache access packet. The interconnect controller 452 parses this header and forwards 416 the header data to the mapping table and compare logic 454. There is an M3 SCID4 entry 426 in the mapping table and so the mapping table and compare logic 454 returns another positive verification 436. The interconnect controller 452 also forwards the third cache access packet 446 to the cache controller for servicing.

While the cache access packets are shown as being verified in parallel, there may be parallel and serial processing, there may be many masters and many SCIDs. Additional header data, as shown in Table 202, and other data may also be used to verify cache access packets. While three cache access packets are shown, these are provided as examples for the many cache access packets that are serviced in the operation of a processing system. The mapping table may be in any suitable form for the operations described herein e.g., the table format of Table 204 and the list of the present diagram.

In many implementations, the speed of the cache access is important to the operation of the processing system. Accordingly, the interconnect controller 452 and the mapping table and compare logic 454 may be configured as hardware logic with dedicated circuits for repeatedly performing the described tasks at high speed.

Figure 5:
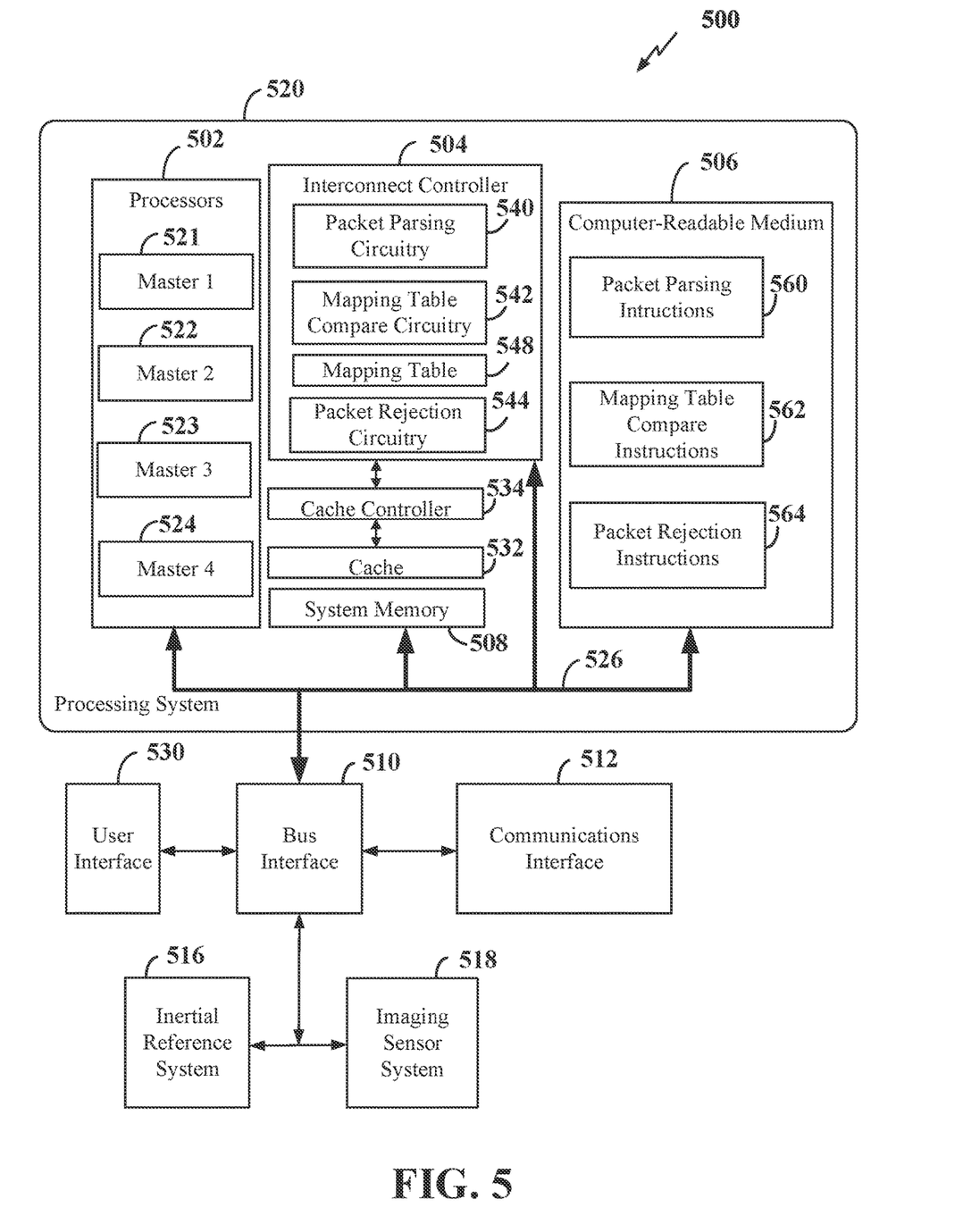
FIG. 5 illustrates a block diagram of an example hardware implementation for a device having a shared cache and an interconnect controller to reject cache access in accordance with aspects of the disclosure.

FIG. 5 illustrates a block diagram of an example of a hardware implementation for a device 500, such as a user equipment, a portable device, a notebook computer, a tablet, a computer, a server, a router, a memory array, or any other suitable device with one or more integrated circuits with masters for a processing system and sharing the same cache. In this example, the device includes a processing system 520 with one or more processors 502, as described above. In accordance with various aspects of the disclosure, an element, or any portion of an element, or any combination of elements may be implemented with the processing system 520. Examples of processors 502 include microprocessors, microcontrollers, digital signal processors (DSPs), field programmable gate arrays (FPGAs), programmable logic devices (PLDs), state machines, gated logic, discrete hardware circuits, and other suitable hardware configured to access a shared cache through a cache controller. In various examples, the device 500 may be configured to perform any one or more of the functions described herein.

In this example, the processing system 520 may be implemented with a bus architecture, represented generally by the bus 526. The bus 526 may include any number of interconnecting buses and bridges depending on the specific application of the processing system 520 and the overall design constraints. The bus 526 communicatively couples together various circuits including the masters 521, 522, 523, 524 of the processors 502, one or more system memories (represented generally by the system memory 508), an interconnect controller 504, cache 458, and computer-readable media (represented generally by the computer-readable medium 506) having instructions stored thereon.

The bus 526 may also link various other circuits such as timing sources, peripherals, voltage regulators, and power management circuits, which are well known in the art, and therefore, will not be described any further. A bus interface 510 provides an interface between the bus 526 and a communication interface 512. The communication interface 512 provides a communication interface or means for communicating through, for example, a wireless or wireline connection with various other apparatus over a wireless transmission medium. In some examples, a wireless device may include two or more interfaces, each configured to communicate through the same or different media. The communication interface 512 provides a communication interface or means of communicating with various other apparatuses and devices (for example, other devices housed within the same apparatus or other external apparatus) over an internal bus or external transmission medium, such as an Ethernet cable, USB cable, Wi-Fi, Bluetooth, Near-Field Connection, and other connectors The bus interface 510 also provides an interface between the bus 526 and an inertial reference system 516, e.g., accelerometers, gyroscopes, impact sensors, orientation sensors, etc., and an imaging sensor system 518, e.g., cameras, proximity sensors, infrared rangefinders, LIDAR, etc. The bus interface 510 also provides an interface between the bus 526 and a user interface 530. Depending upon the nature of the apparatus, the user interface 530 may include a local or remote interface (for example, keypad, display, speaker, microphone, joystick). Of course, such a user interface is optional, and may be omitted in some examples, such as an Internet of Things device.

The processors 502 are responsible for performing the functions of the device 500. The configuration and use for the masters 521, 522, 523, 524 depends on the purpose and functions of the device. There may be more or fewer masters. In addition to general purpose masters, one or more of the masters may be specialized for particular functions, e.g., image processing, graphics rendering, audio recording, transcoding, and rendering, communications processing including encoding and decoding, position and motion determination, digital signal processing, artificial intelligence, etc. One or more of the masters may also be configured for system management, security, and other functions. The processors 502 use the cache 532 through the interconnect controller 504 to support one or more of these functions in support of operating the device 500. The interconnect controller 504 is responsible for managing access to the cache 532 through a cache controller 534, which may be though the bus 526, including the execution of software stored on the computer-readable medium 506. The software, when executed by the interconnect controller 504, causes the interconnect controller 504 to perform the various functions described below for cache access rejection. In this example, the compare logic is incorporated into the interconnect controller. In some examples, the compare logic is a discrete and separate unit. The computer-readable medium 506, the interconnect controller 504, and the cache 532 may also be used for storing data that is manipulated by the processing system 520 when executing software.

The interconnect controller 504 may be a part of one or more masters of the processors 502 and perform operations by means of a processor core executing software stored in the computer-readable medium 506, or the interconnect controller 504 may be independent of the processors 502 within the processing system 520 (as shown) to execute software stored on the computer-readable medium 506 using its own processing resources. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The interconnect controller 504 may be implemented in hardware, firmware, a state machine, or other device without need for the instructions in the computer-readable medium 506.

The computer-readable medium 506 may be a non-transitory computer-readable medium. A non-transitory computer-readable medium includes, by way of example, a magnetic storage device (for example, hard disk, floppy disk, magnetic strip), an optical disk (for example, a compact disc (CD) or a digital versatile disc (DVD)), a smart card, a flash memory device (for example, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 520, external to the processing system 520, or distributed across multiple entities including the processing system 520. Those skilled in the art will recognize how best to implement the described functionality presented throughout this disclosure depending on the particular application and the overall design constraints imposed on the overall system.

The device 500 may be configured to perform any one or more of the operations described herein. In some aspects of the disclosure, the interconnect controller 504, as utilized in the device 500, may include circuitry configured for various functions.

The interconnect controller 504 is coupled to the system memory 508 through the bus 526. The system memory 508 may include parameters and configuration values, that may be initial settings, operating system settings, or application settings for configuring the mapping table 548 described above, including the configuration register. The mapping table 548 used by the interconnect controller 504 may be in the interconnect controller 504, the computer-readable medium 506, the system memory 508, compare logic (not shown) or another device.

The interconnect controller 504 may include packet parsing circuitry 540 configured to receive cache access packets from a master and to parse the master identifier and sub-cache index identifier in the cache access packet. The packet parsing circuitry 540 may also be configured to parse an operation identifier and other items from the cache access packet. The packet parsing circuitry 540 may include one or more hardware components that provide the physical structure that performs various processes related to parsing received cache access packets. The packet parsing circuitry 540 may include functionality for a means for parsing received cache access packets. The packet parsing circuitry 540 may further be configured to execute packet parsing instructions 560 included on the computer-readable medium 506 to implement the packet parsing described herein.

The interconnect controller 504 may include mapping table compare circuitry 542, also referred to herein as compare logic, configured to compare the master identifier and the sub-cache index identifier parsed from the cache access packet to master identifier associations with sub-cache index identifiers in the mapping table 548 as discussed herein. The mapping table compare circuitry may include functionality for a means to compare the master identifier and the sub-cache index identifier parsed from the cache access packet to master identifier associations with sub-cache index identifiers in mapping table 548 of the cache controller. The mapping table compare circuitry 542 may further be configured to execute mapping table compare instructions 562 included on the computer-readable medium 506 to implement one or more functions described herein.

The processing system 520 interconnect controller 504 may include packet rejection circuitry 544 configured to reject the cache access packet in response to the master identifier not being associated with the sub-cache index identifier in the mapping table 548 as discussed herein. The packet rejection circuitry 544 may include functionality for rejecting the cache access packet in response to the master identifier not being associated with the sub-cache index identifier in the mapping table 548. The packet rejection circuitry 544 may include further functionality for sending an error warning and/or security warning to a security master in response to the master identifier not being associated with the sub-cache index identifier in the mapping table 548.

The packet rejection circuitry 544 may include functionality for a means for rejecting the cache access packet in response to the master identifier not being associated with the sub-cache index identifier in the mapping table. The packet rejection circuitry 544 may further be configured to execute packet rejection instructions 564 included on the computer-readable medium 506 to implement one or more functions described herein.

The circuit architecture described herein may be implemented on one or more ICs, analog ICs, RFICs, mixed-signal ICs, ASICs, printed circuit boards (PCBs), electronic devices, etc. The circuit architecture described herein may also be fabricated with various process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuits described herein may be a stand-alone device or may be part of a larger device. A device may be (i) a stand-alone IC, (ii) a set of one or more ICs that may include memory ICs for storing data and/or instructions, (iii) a radio frequency integrated circuit (RFIC) such as an RF receiver (RFR) or an RF transmitter/receiver (RTR), (iv) ASICs such as a mobile station modem (MSM), (v) a module that may be embedded within other devices, (vi) a receiver, cellular phone, wireless device, handset, or mobile unit, (vii) etc.

Figure 6:
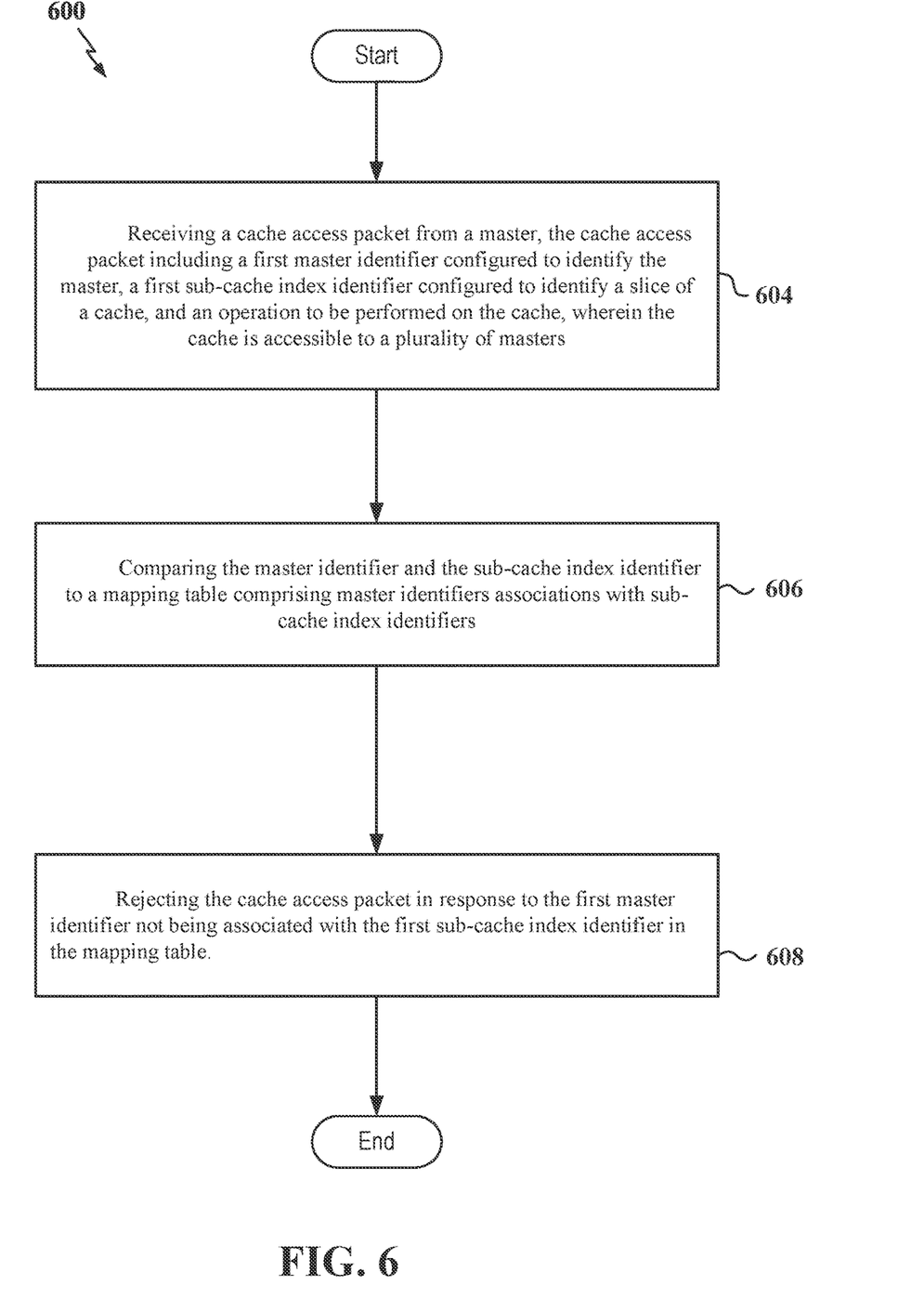
FIG. 6 illustrates a flow diagram of a method for rejecting cache access using a mapping table, in accordance with aspects of the disclosure.

FIG. 6 is a process flow diagram of rejecting a cache access using a mapping table. After start, at block 602, the process includes receiving a cache access packet from a master, the cache access packet including a first master identifier configured to identify the master, a first sub-cache index identifier configured to identify a slice of a cache, and an operation to be performed on the cache, wherein the cache is accessible to a plurality of masters. The first master identifier and the first sub-cache index identifier may be extracted before a comparing at block 604.

At block 604, the process includes comparing the first master identifier and the first sub-cache index identifier to a mapping table comprising master identifiers associated with sub-cache index identifiers. The cache access packet may also have a physical identifier (PID) and the comparing includes comparing the PID to physical identifiers in the mapping table.

At block 606, the process includes rejecting the cache access packet in response to the first master identifier not being associated with the first sub-cache index identifier in the mapping table. An error warning may also be sent to a security master in response to the first master identifier not being associated with the first sub-cache index identifier in the mapping table. The error warning message may be an interrupt request.

In some examples, the process may also include forwarding the cache access packet to a cache controller in response to the first master identifier being associated with the first sub-cache index identifier in the mapping table.

In some examples, the mapping table is generated at startup by loading the mapping table from a configuration register. The configuration register may be in system memory, in a boot register, in the interconnect controller, or another location.

In some examples, a change packet indicates a grant of a second slice of cache to a second master. It is received at an interconnect controller and the mapping table is modified in response to the change packet. The change packet may have a mapping table update message that has the same structure as a cache access packet with a different operation code. A reply may be sent to the second master indicating the that requested second slice of cache has been granted.

As used herein, "or" is intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor and the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

In one or more exemplary aspects, the functions described may be implemented in hardware, software, firmware, or any combination thereof. If implemented in software, the functions may be stored on or transmitter over as one or more instructions or code stored on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM EEPROM, CD-ROM or other optical disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The following provides an overview of examples of the present disclosure.

Example 1: An apparatus comprising: a cache having a plurality of slices, the cache being accessible to a plurality of masters; an interconnect controller coupled to the cache and coupled to the plurality of masters and configured to receive a cache access packet from a master, the cache access packet including a first master identifier configured to identify the master, a first sub-cache index identifier configured to identify a slice of the cache, and an operation to be performed on the cache; a mapping table comprising master identifiers associated with sub-cache index identifiers; and compare logic configured to compare the first master identifier and the first sub-cache index identifier to the mapping table, wherein the interconnect controller is configured to reject the cache access packet in response to the first master identifier not being associated with the first sub-cache index identifier in the mapping table.

Example 2: The apparatus of example 1, wherein the interconnect controller is configured to send an error warning to a security master in response to the first master identifier not being associated with the first sub-cache index identifier in the mapping table.

Example 3: The apparatus of example 2, wherein the error warning comprises an interrupt request.

Example 4: The apparatus of any one or more of the above examples, wherein the interconnect controller is configured to send a security warning to a security master in response to the first master identifier not being associated with the first sub-cache index identifier in the mapping table.

Example 5: The apparatus of any one or more of the above examples, wherein the cache is a last level cache.

Example 6: The apparatus of any one or more of the above examples, wherein the cache access packet comprises a physical identifier (PID) and wherein the comparing comprises comparing the PID to physical identifiers in the mapping table.

Example 7: The apparatus of any one or more of the above examples, wherein the interconnect controller is configured to extract the first master identifier and the first sub-cache index identifier before the comparing.

Example 8: The apparatus of any one or more of the above examples, wherein the interconnect controller is configured to generate the mapping table at startup by loading the mapping table from a configuration register.

Example 9: The apparatus of any one or more of the above examples, wherein the interconnect controller is configured to receive a change packet indicating a grant of a second slice of cache to a second master and modify the mapping table in response to the change packet.

Example 10: The apparatus of example 9, wherein the change packet comprises a table update message having a same structure as a cache access packet with a different operation code.

Example 11: The apparatus of example 9 or 10, wherein the interconnect controller is configured to send a reply to the second master indicating the that requested second slice of cache has been granted.

Example 12: The apparatus of any one or more of the above examples, wherein the interconnect controller is configured to forward the cache access packet to a cache controller in response to the first master identifier being associated with the first sub-cache index identifier in the mapping table.

Example 13: A method comprising: receiving a cache access packet from a master, the cache access packet including a first master identifier configured to identify the master, a first sub-cache index identifier configured to identify a slice of a cache, and an operation to be performed on the cache, wherein the cache is accessible to a plurality of masters; comparing the first master identifier and the first sub-cache index identifier to a mapping table comprising master identifiers associated with sub-cache index identifiers; and rejecting the cache access packet in response to the first master identifier not being associated with the first sub-cache index identifier in the mapping table.

Example 14: The method of example 13, comprising sending an error warning to a security master in response to the first master identifier not being associated with the first sub-cache index identifier in the mapping table.

Example 15: The method of example 14, wherein the error warning comprises an interrupt request.

Example 16: The method of any one or more of examples 13 to 15, wherein the cache access packet comprises a physical identifier (PID) and wherein the comparing comprises comparing the PID to the master identifiers in the mapping table.

Example 17: The method of any one or more of examples 13 to 16, comprising extracting the first master identifier and the first sub-cache index identifier before the comparing.

Example 18: The method of any one or more of examples 13 to 17, comprising generating the mapping table at startup by loading the mapping table from a configuration register.

Example 19: The method of any one or more of examples 13 to 18, comprising receiving a change packet indicating a grant of a second slice of cache to a second master and modifying the mapping table in response to the change packet.

Example 20: The method of example 19, wherein the change packet comprises a table update message having a same structure as a cache access packet with a different operation code.

Example 21: The method of example 19 or 20, comprising sending a reply to the second master indicating the that requested second slice of cache has been granted.

Example 22: The method of any one or more of examples 13 to 21, comprising forwarding the cache access packet to a cache controller in response to the first master identifier being associated with the first sub-cache index identifier in the mapping table.

Example 23. An apparatus comprising: means for receiving a cache access packet from a master, the cache access packet including a first master identifier configured to identify the master, a first sub-cache index identifier configured to identify a slice of a cache, and an operation to be performed on the cache, wherein the cache is accessible to a plurality of masters; means for comparing the first master identifier and the first sub-cache index identifier to a mapping table comprising master identifiers associated with sub-cache index identifiers; and means for rejecting the cache access packet in response to the first master identifier not being associated with the first sub-cache index identifier in the mapping table.

Example 24: The apparatus of example 23, comprising means for forwarding the cache access packet to a cache controller in response to the first master identifier being associated with the first sub-cache index identifier in the mapping table.

What is claimed is:

1. An apparatus comprising:
    a cache having a plurality of slices, wherein the cache is accessible to a plurality of masters;
    an interconnect controller coupled to the cache and coupled to the plurality of masters and configured to receive a cache access packet from a master among the plurality of masters, wherein the cache access packet includes a first master identifier configured to identify the master, a first sub-cache index identifier configured to identify a slice of the cache, and an operation to be performed on the cache;
    a mapping table comprising master identifiers associated with sub-cache index identifiers; and
    compare logic configured to compare the first master identifier and the first sub-cache index identifier to the mapping table,
    wherein the interconnect controller is configured to reject the cache access packet and to send an error warning to a security master in response to the first master identifier not being associated with the first sub-cache index identifier in the mapping table,
    wherein the error warning includes the first master identifier and the first sub-cache index identifier.

2. The apparatus of claim 1, wherein the error warning comprises an interrupt request.

3. The apparatus of claim 1, wherein the cache is a last level cache.

4. The apparatus of claim 1, wherein the cache access packet comprises a physical identifier (PID) and wherein the comparing comprises comparing the PID to physical identifiers in the mapping table.

5. The apparatus of claim 1, wherein the interconnect controller is configured to extract the first master identifier and the first sub-cache index identifier before the comparing.

6. The apparatus of claim 1, wherein the interconnect controller is configured to generate the mapping table at startup by loading the mapping table from a configuration register.

7. The apparatus of claim 1, wherein the interconnect controller is configured to receive a change packet indicating a surrender of the slice of cache and to modify the mapping table in response to the change packet, wherein the change packet includes a master identifier and a sub-cache index identifier.

8. The apparatus of claim 7, wherein the interconnect controller is configured to receive a cache change packet from an application running on a second master to request a second slice of cache and to send a table update message to update the mapping table by associating a second master identifier with the first sub-cache index identifier in the mapping table.

9. The apparatus of claim 7, wherein the change packet comprises a mapping table update message having a same structure as a cache access packet with a different operation code.

10. The apparatus of claim 7, wherein the interconnect controller is configured to receive a cache change packet from a second master to request a slice of cache, to update the mapping table to add a second master identifier in association with the surrendered slice of cache and to send a reply to the second master indicating that the surrendered slice of cache has been granted.

11. The apparatus of claim 1, wherein the interconnect controller is configured to forward the cache access packet to a cache controller in response to the first master identifier being associated with the first sub-cache index identifier in the mapping table.

12. A method comprising:
    receiving a cache access packet from a master among a plurality of masters, the cache access packet including a first master identifier configured to identify the master, a first sub-cache index identifier configured to identify a slice of a cache, and an operation to be performed on the cache, wherein the cache is accessible to the plurality of masters;
    comparing the first master identifier and the first sub-cache index identifier to a mapping table comprising master identifiers associated with sub-cache index identifiers;
    rejecting the cache access packet in response to the first master identifier not being associated with the first sub-cache index identifier in the mapping table; and
    sending an error warning to a security master in response to the first master identifier not being associated with the first sub-cache index identifier in the mapping table,
    wherein the error warning includes the first master identifier and the first sub-cache index identifier.

13. The method of claim 12, wherein the error warning comprises an interrupt request.

14. The method of claim 12, wherein the cache access packet comprises a physical identifier (PID) and wherein the comparing comprises comparing the PID to physical identifiers in the mapping table.

15. The method of claim 12, comprising extracting the first master identifier and the first sub-cache index identifier before the comparing.

16. The method of claim 12, comprising generating the mapping table at startup by loading the mapping table from a configuration register.

17. The method of claim 12, comprising receiving a change packet indicating a surrender of the slice of cache and modifying the mapping table in response to the change packet, wherein the change packet includes a master identifier and a sub-cache index identifier.

18. The method of claim 17, wherein the change packet comprises a mapping table update message having a same structure as a cache access packet with a different operation code.

19. The method of claim 17, comprising:
    receiving a cache change packet from a second master to request a slice of cache;
    updating the mapping table to add a second master identifier in association with the surrendered slice of cache; and sending a reply to the second master indicating that the surrendered slice of cache has been granted.

20. The method of claim 12, comprising forwarding the cache access packet to a cache controller in response to the first master identifier being associated with the first sub-cache index identifier in the mapping table.

21. A non-transitory computer-readable medium having instructions stored thereon that when operated on by a processing system, cause the processing system to perform operations comprising:

receiving a cache access packet from a master among a plurality of masters, the cache access packet including a first master identifier configured to identify the master, a first sub-cache index identifier configured to identify a slice of a cache, and an operation to be performed on the cache, wherein the cache is accessible to the plurality of masters;

comparing the first master identifier and the first sub-cache index identifier to a mapping table comprising master identifiers associated with sub-cache index identifiers;

rejecting the cache access packet in response to the first master identifier not being associated with the first sub-cache index identifier in the mapping table; and sending an error warning to a security master in response to the first master identifier not being associated with the first sub-cache index identifier in the mapping table, wherein the error warning includes the first master identifier and the first sub-cache index identifier.

22. The computer-readable medium of claim 21, the operations comprising forwarding the cache access packet to a cache controller in response to the first master identifier being associated with the first sub-cache index identifier in the mapping table.

* * * * *